PHASE LOCK RECEIVER WITH A CONSTANT SLOPE NETWORK

Filed May 2, 1968 7 Sheets-Sheet 1

INVENTOR.
THEODORE F. HAGGAI,
BY
J. K. Haskell
ATTORNEY.

PHASE LOCK RECEIVER WITH A CONSTANT SLOPE NETWORK

Filed May 2, 1968

7 Sheets-Sheet 2

PHASE LOCK RECEIVER WITH A CONSTANT SLOPE NETWORK

Filed May 2, 1968 7 Sheets-Sheet 5

Dec. 29, 1970 T. F. HAGGAI 3,551,829
PHASE LOCK RECEIVER WITH A CONSTANT SLOPE NETWORK
Filed May 2, 1968 7 Sheets-Sheet 7

United States Patent Office 3,551,829
Patented Dec. 29, 1970

3,551,829
PHASE LOCK RECEIVER WITH A CONSTANT SLOPE NETWORK

Theodore F. Haggai, Costa Mesa, Calif., assignor to Hughes Aircraft Company, Culver City, Calif., a corporation of Delaware Filed May 2, 1968, Ser. No. 726,016
Int. Cl. H03b 3/08
U.S. Cl. 329—122 24 Claims

ABSTRACT OF THE DISCLOSURE

A phase-lock receiver with a new loop filter is disclosed. The filter provides constant loop damping despite variations in loop gain and bandwidth adjustments. The loop filter consists of a plurality of pole-zero pairs distributed in frequency over the frequency bandwidth of interest with geometric uniformity. The loop filter provides a gain slope, expressed in db/octave which is constant to within an arbitrarily small ripple error and extends over several decades of frequency. A single gain control adjustment is provided to optimize the loop operation over a wide range of spectral bandwidths.

BACKGROUND OF THE INVENTION

(1) Field of the invention

This invention generally relates to a frequency demodulator and, more particularly, to improvements in a frequency demodulator which incorporates a phase-lock loop, often referred to as a second-order loop.

(2) Description of the prior art

The advantages realized from the use of a phase-lock loop in a frequency demodulator are well known and are extensively described in the literature. Some of them are highlighted in U.S. Pat. No. 3,346,815, issued Oct. 10, 1967, to the applicant of the present application. Basically, in a phase-lock loop used for frequency demodulation, the phase error due to phase modulation of an input carrier signal is inversely proportional to the open loop gain, evaluated at the modulating frequency rate. Thus, for any given index of modulation or rate of doppler shift phase error due to modulation may be reduced by increased loop gain.

However, the same loop gain increase also increases the loop noise bandwidth and consequently, the amount of phase noise to which the loop may respond. As a result, greater carrier power is required to maintain a reasonably acceptable signal-to-noise ratio. Therefore, in designing a phase-lock loop for any set of signal parameters, there exists an optimum loop gain which provides maximum sensitivity with respect to a given input carrier power.

When a conventional phase-lock loop is optimized for a given set of signal parameters its does not perform optimum demodulation when the signal parameters, such as carrier deviation and modulation bandwidth are altered. Restoration of optimum performance requires the adjustments of two time constants. These time constants control loop gain and closed loop damping which in turn define the demodulator noise bandwidth. Since the adjustments of the two time constants must be very precise, prior art frequency demodulators incorporating the phase-lock loop are designed to accommodate a relatively narrow range of signal parameters. Any design directed toward accommodating a wide range of signal parameters is fraught with complex switching, the precision of which must be high if performance degradation is to be avoided.

OBJECTS AND SUMMARY OF THE INVENTION

It is a primary object of this invention to provide an improved frequency demodulator of the type incorporating a phase-lock loop.

Another object of the present invention is to provide a frequency demodulator in which the performance of a phase-lock loop incorporated therein is easily adjusted to accommodate signal parameter changes without performance degradation.

A further object of the invention is to provide a phase-lock loop utilizing frequency demodulators in which only a single adjustment is required to produce optimum demodulation over a wide range of signal indexes.

Still a further object is the provision of an improved phase-lock loop for use in a frequency demodulation to produce optimum tracking of doppler shifted signals whose received power varies over a wide range with a single adjustment.

These and other objects of the invention are achieved by providing in the phrase-lock loop of the frequency demodulator a unique loop filter, which provides constant loop damping despite variations in loop gain and bandwidth adjustments.

Briefly, a typical phase-lock loop consists of a phase detector, a voltage-controlled oscillator (VCO) and generally a loop amplifier. The latter is needed to provide sufficient loop gain. The unique loop filter is connected across the loop amplifier between the phase detector and the VCO. The loop filter consists of pole-zero pairs distributed in frequency with geometric uniformity. The loop filter produces a gain slope expressed in db/octave which is substantially constant, extending over several decades of frequency. The loop gain is a function of phase detector drive level, while the constant gain slope results in a fixed, substantially constant closed loop damping regardless of loop gain or bandwidth. These conditions are present as long as the frequency of unity loop gain is within the loop network bandwidth.

The unique loop filter may be combined with the loop amplifier when the latter is used to act as an active loop filter. However, if the loop amplifier is not required, which is the case when the phase detector and the VCO provide sufficient loop gain, the loop filter of the present invention may be used to serve as a passive loop filter.

The novel features of the invention are set forth with particularity in the appended claims. The invention will best be understood from the following description when read in conjunction with the accompanying drawings.

DESCRIPTION OF THE PREFERRED EMBODIMENTS

Since the present invention relates to an improved frequency demodulator with a phase-lock loop by incorporating a unique loop filter, the advantages realized with and the characteristics of the invention may best be highlighted by first summarizing the performance of a conventional phase-lock frequency demodulator before proceeding to present the novel features and advantages of the invention. The conventional phase-lock loop may best be described and explained in conjunction with FIGS. 1, 2, and 3, to which reference is made herein.

Figure 1:
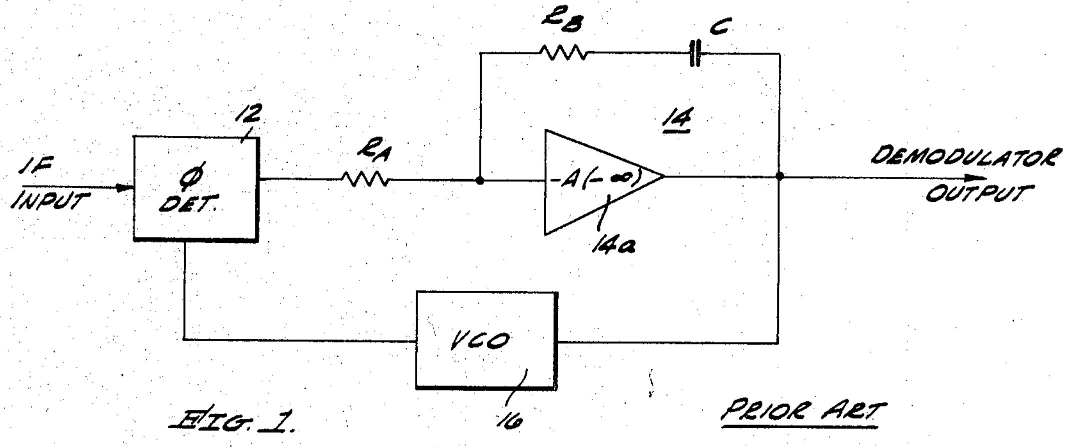
FIG. 1 is a combination block and schematic diagram of a prior art phase-lock loop in a frequency demodulator.

As seen in FIG. 1, the conventional phase-lock loop consists of a phase detector 12 which is provided with one input from an intermediate frequency (IF) stage of a frequency modulation (FM) receiver in which the frequency demodulator forms a part of the receiver output unit. Conventionally the phase detector output is supplied to a loop amplifier 14. The output of amplifier 14 in addition to serving as the demodulator output, is supplied to a VCO 16 which forms part of the loop and whose output is fed to the phase detector 12 to close the phase-lock loop.

In FIG. 1, the loop amplifier 14 is shown consisting of an input resistor $R_A$, an active amplification stage **14*a*, shunted by a feedback branch between its input and output, consisting of a resistor $R_B$ and a capacitor C. When sufficient loop again is available, the amplification stage 14*a*** may be eliminated, in which case $R_B$ and C are connected in series between $R_A$ and a reference potential, such as ground. Such an arrangement represents a passive rather than an active network.

Figures 2, 3, 5, 6:
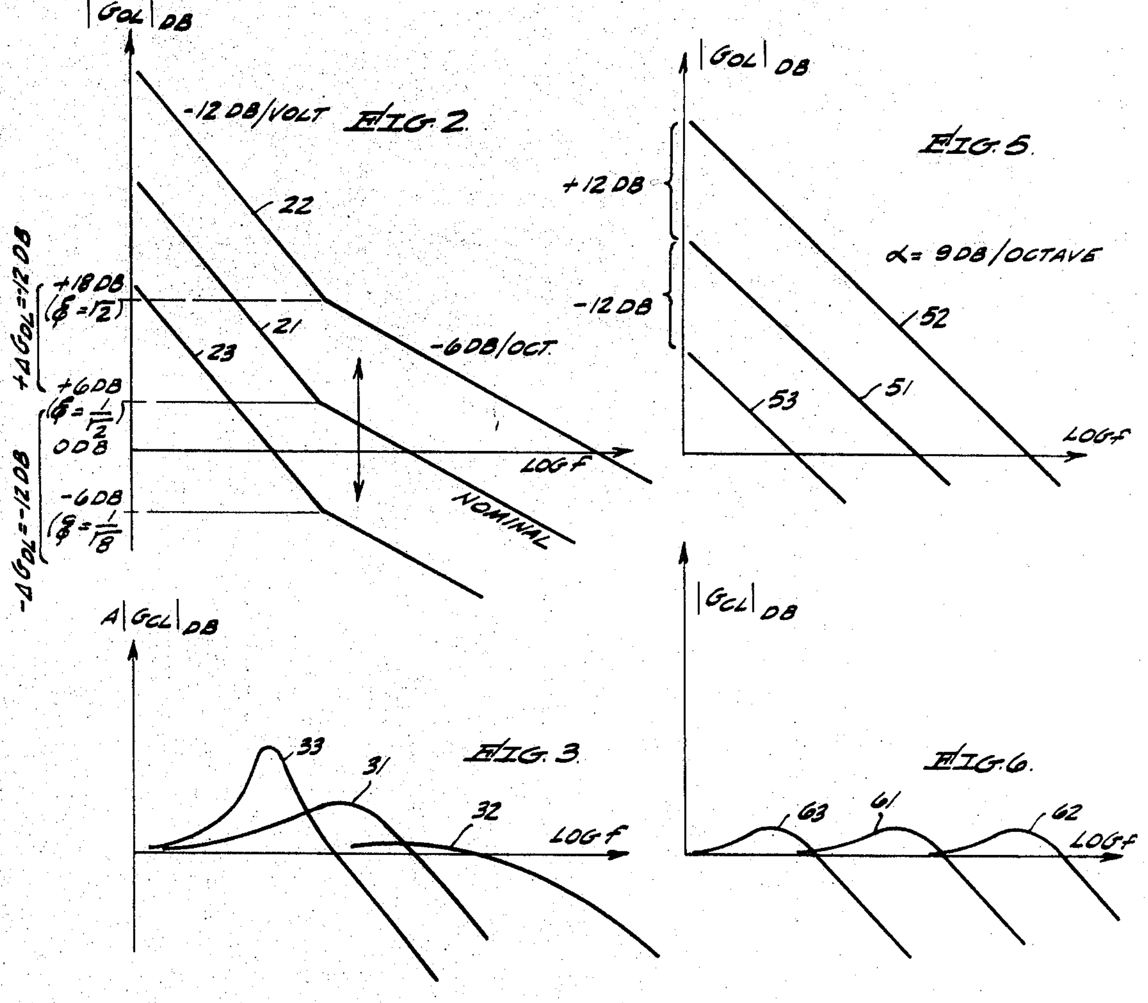
FIGS. 2 and 3 are diagrams useful in explaining the characteristics of the loop shown in FIG. 1.
FIGS. 5 and 6 are diagrams useful in explaining the characteristics of the novel phase-lock loop of the invention.

The operation of such a conventional phase-lock loop is best explained in connection with FIG. 2 which represents an asymptotic plot of the loop's open-loop frequency response. Therein, line 21 represents the open-loop response for a nominal design center, while lines 22 and 23 represent the responses due to gain variation of 12 db above and below the nominal value. The line 21 in FIG. 2 is analogous to line 120 in FIG. 3 of U.S. Pat. No. 3,346,-815. Plots of closed-loop response for the three cases shown in FIG. 2 are diagrammed in FIG. 3 wherein lines 31, 32 and 33 correspond to the cases represented in FIG. 2 by lines 21, 22, and 23, respectively.

From FIG. 3, it should be appreciated that the closed-loop response of the conventional phase-lock loop is very sensitive to gain changes. An increase in gain (line 22, FIG. 2) results in excessive damping and greater than, as represented by line 32, optimum noise bandwidth. Conversely, a decrease in gain (line 23) produces inadequate damping as represented by line 33. Consequently, in a prior art arrangement optimum operation, under variable gain conditions, can only be achieved by adjusting the overall loop gain and the bandwidth upper frequency or the closed loop damping. The gain is adjustable by varying the time constant $R_AC$ and the closed loop damping is controlled by adjusting the time constant $R_BC$.

Figure 4:
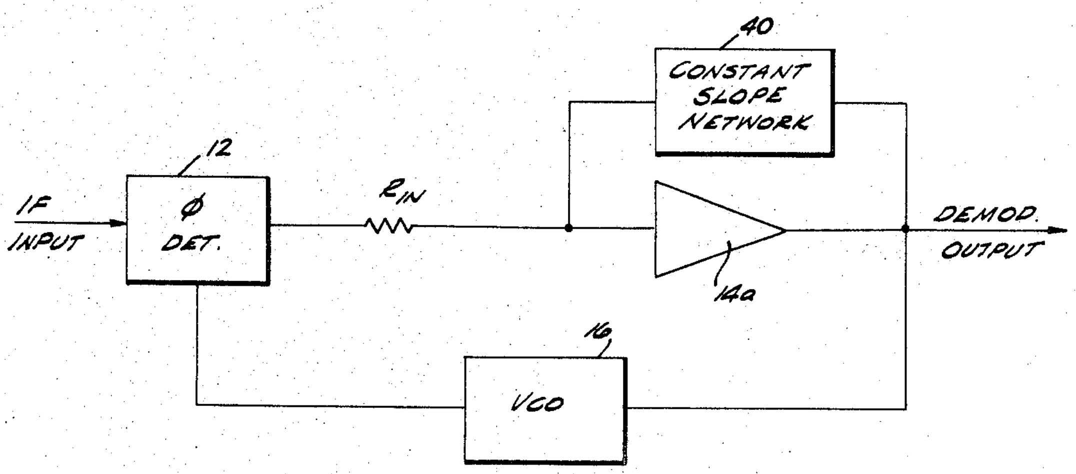
FIG. 4 is a simplified block diagram of the novel phase-lock loop of the present invention.

In accordance with the teachings of the present invention, the adjustment problems are greatly reduced and performance improved significantly by incorporating in the phase-lock loop a unique loop filter also referred to herein as the constant slope network, designated by numeral 40 in FIG. 4 to which reference is made herein.

In said figure, elements like those previously described are designated by like numerals. Briefly stated, the constant slope network which is shunted across the amplification stage **14*a*** of the loop filter is designed to produce constant loop damping despite variations in loop gain and bandwidth adjustments. In a phase-lock loop incorporating the teachings of this invention, closed loop damping is determined by the chosen open-loop gain slope and is constant regardless of open-loop gain.

Before proceeding to analyze and explain the criteria employed in designing a constant slope network, in accordance with this invention, attention is directed to FIGS. 5 and 6 which are plots of the open-loop and closed-loop responses of the improved phase-lock loop with the unique constant loop network, taught herein. In FIG. 5, which is analogous to FIG. 2, line 51 represents a nominal design condition while lines 52 and 53 represent gain above and below the nominal design value. FIG. 6 represents plots of closed-loop response wherein lines 61, 62, and 63 correspond to the cases represented by lines 51, 52, and 53, respectively.

From FIG. 6, it should be apparent that in the improved phase-lock loop of the present invention, the closed-loop response is unchanged in that the damping is unchanged. The only parameter that is affected by open-loop gain is the closed-loop bandwidth. Optimum performance within a selected nominal design bandwidth may be achieved by simply adjusting the closed-loop gain, which can be realized with a single adjustment of a loop gain control device, for example, a potentiometer.

Figure 7A:
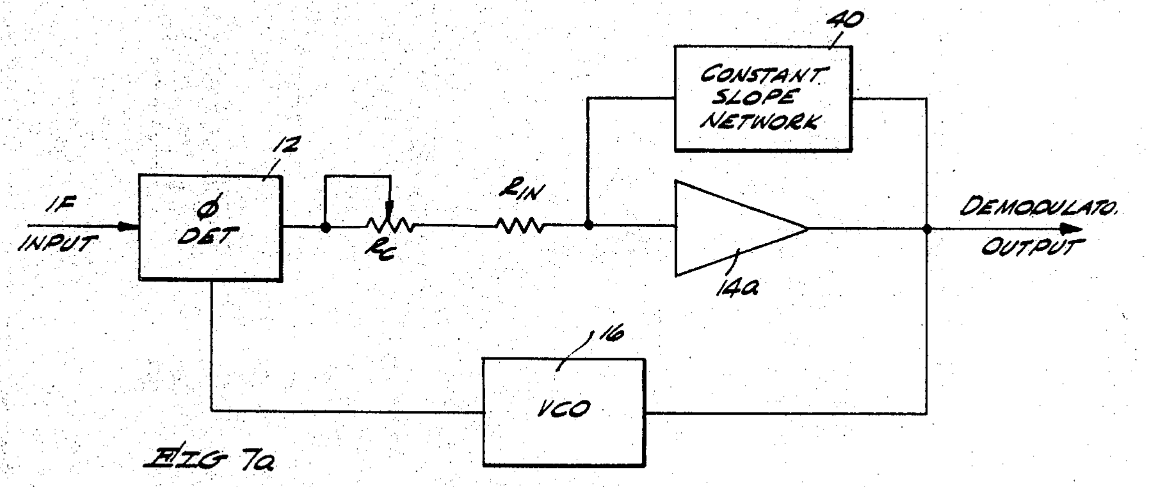
Figure 7B:
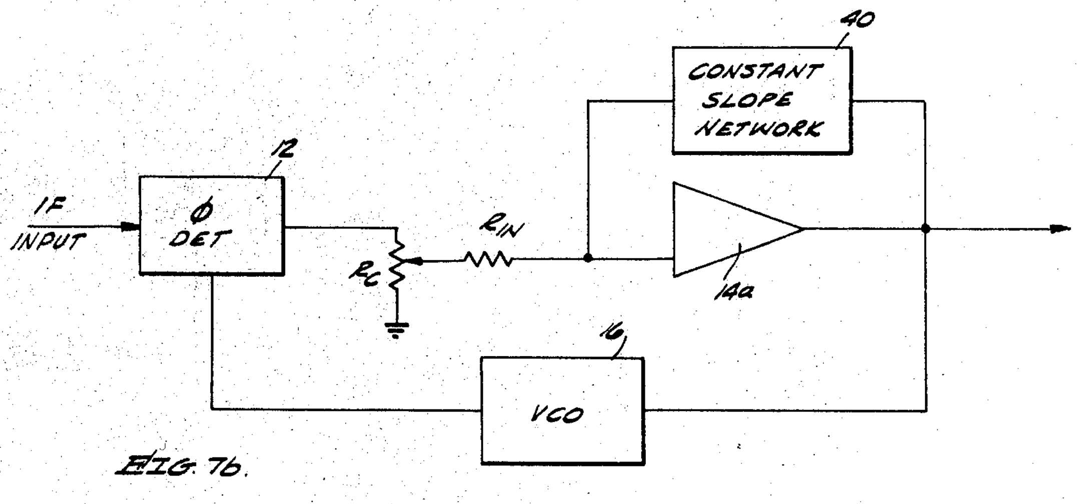
Figure 7C:
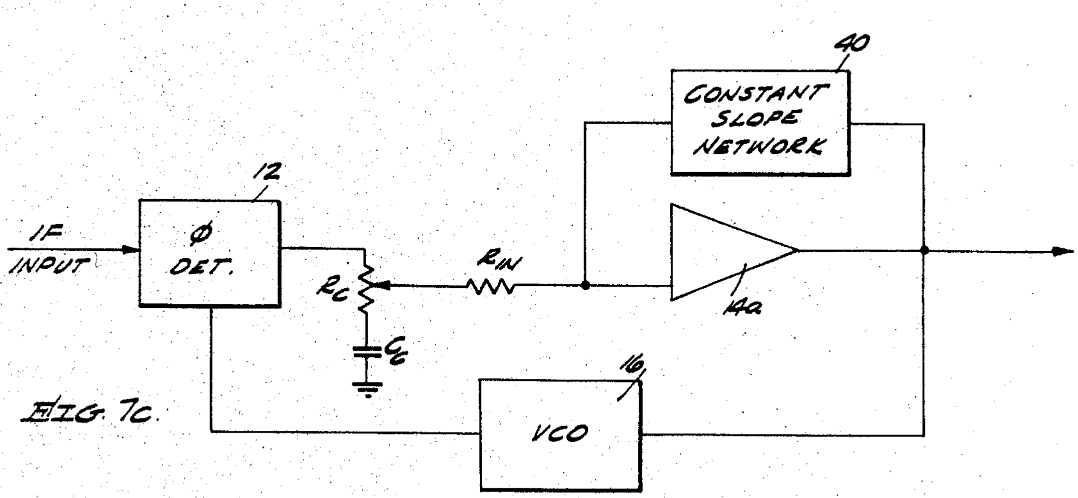

Reference is now made to FIGS. 7*a*, 7*b*, and 7*c*, which are three combination block and schematic diagrams of three different embodiments of the present invention, wherein like numerals designate like elements. In these figures $R_C$ designates the potentiometer used for gain or bandwidth control. In the embodiment shown in FIG. 7*c*, $C_C$ designates a capacitor which together with $R_C$ is used for gain control. This embodiment may be regarded as preferable since in it, the D.C. gain of the loop is constant regardless of the loop bandwidth adjustment. High D.C. loop gain is desirable to minimize static phase error due to input frequency shift or VCO tuning error. In FIGS. 7*a*, 7*b*, and 7*c*, $R_{in}$ represents an input resistor of the loop amplifier which is analogous to the resistor $R_A$ herebefore described in conjunction with FIG. 1.

Figure 8:
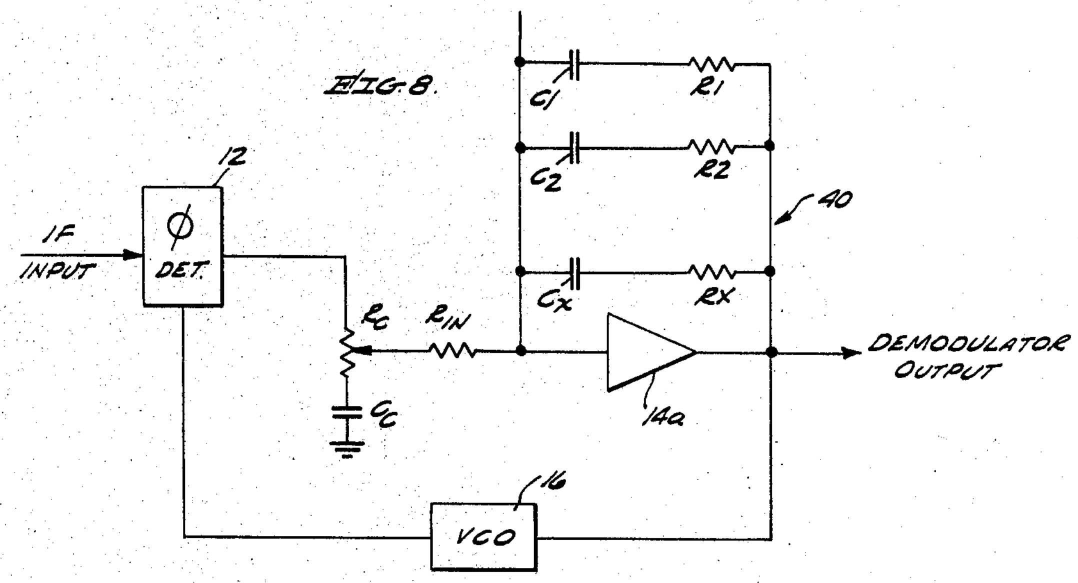
FIGS. 7*a*, 7*b*, 7*c*, and 8 are combination block and schematic diagrams of different embodiments of the invention.

Attention is now directed to FIG. 8 which is similar to FIG. 7*c* except that in the former the constant slope network 40 is shown in complete schematic detail. Basically, the network consists of a plurality, such as $x$ branches, each consisting of a resistor designated $R_1$, $R_2$ . . . $R_x$ and connected in series with a capacitor designated $C_1$, $C_2$ . . . $C_x$. All the branches are connected in parallel across the amplification stage **14*a***.

Alternately stated, the network consists of pole-zero pairs distributed in frequency with geometric uniformity. The network provides a gain slope, expressed in db/octave which is constant to within an arbitrarily small ripple error, and which extends over several decades of frequency. The constant slope over the frequency of interest is represented in FIG. 5 by each of lines 51, 52, and 53.

Figure 9:
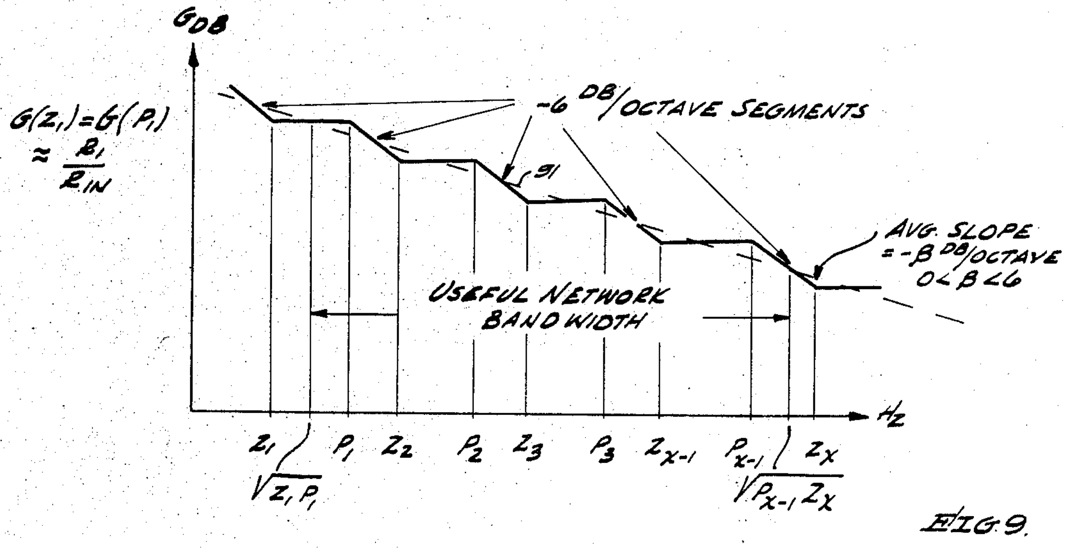
FIG. 9 is a diagram of poles and zeroes over a useful network bandwidth.

The synthesis of the network 40 may best be explained in conjunction with FIG. 9 which is an asymptotic plot of the network's gain versus frequency, including the frequency band of interest. In FIG. 9, $Z_i$ designates the frequency of the $i_{th}$ zero in c.p.s. or Hz., while $P_i$ designates the frequency of the $i_{th}$ pole, and $i=1, 2, 3$ . . . $x$. The number of pole-zero pairs, i.e., the maximum value of $i$, namely $x$, depends upon the bandwidth over which a constant slope is to be synthesized.

A simply defined synthesis procedure has ben formulated with respect to FIG. 9 by first defining a term N, where $$N=\frac{Z_{i+1}}{Z_i}=\frac{P_{i+1}}{P_i} \qquad (1)$$

This choice results in uniform geometric spacing of pole-zero pairs.

To obtain an average slope of $\beta$db/octave where $0<\beta<6$, the following relationships are imposed:

$$\frac{G(Z_i)}{G(Z_i+1)}=\left[\frac{Z_i+1}{Z_i}\right]^{\beta/6}=N^{\beta/6} \qquad (2)$$

Also, $$\frac{P_i}{Z_i}=N^{(1-\beta/6)} \qquad (3)$$

$$\frac{Z_i+1}{Z_i}=N^{\beta/6} \qquad (4)$$

and $$P_i=N^{(i-1)}\ P_1 \text{ or } Z_i=N^{(i-1)}\ Z_1 \qquad (5)$$

In FIG. 9, the lower frequency of the bandpass of interest is designated by $\sqrt{Z_1P_1}$ and the upper frequency by $\sqrt{P_{x-1}Z_x}$. The zeroes are identified with respect to network parameters by the following relationships:

$$Z_1=\frac{1}{2\pi R_1C_1} \qquad (6_1)$$

$$\vdots$$

$$Z_x=\frac{1}{2\pi R_xC_x} \qquad (6_x)$$

In the synthesize of a network of arbitrary bandwidth and a slope $\beta$ between zero (0) and 6 db/octave, the value of $R_1$ is found to be related to the $k_{th}$ feedback resistor as follows:

$$\frac{R_1}{R_k}=[N^{\beta/6}-1]N^{\beta/6(k-2)} \qquad (7)$$

where $$k=2, 3, 4 \ldots x$$

Similarly, the $k_{th}$ capacitor is related to $C_1$ by, $$\frac{C_k}{C_1}=\frac{R_1}{R_k}N^{(1-k)} \qquad (8)$$

where $$k=2, 3, 4 \ldots x$$

Thus, it is seen that when $R_1$ is known, all the values of the resistors $R_2$ thorugh $R_x$ may be determined by solving Equation 7. The capacitance values of the capacitors may be determined from Equation 8, once $C_1$ is calculated. The value $R_1$ is generally a function of the impedance charcteristics of the amplification stage 14*a*. Once $R_1$ is known, $Z_1$ is calculated for a desired lowest frequency of interest. $C_1$ may be calculated by solving Equation $6_1$.

It has been found that when the low frequency response is given a slope of −6 db/octave to the first zero ($Z_1$), the slope being designated in FIG. 9 by numeral 91, the useful bandwidth of the network is somewhat reduced because the phase at $Z_1$ for certain values of N, such as 16 and 3 db/octave respectively, is close to 55°, rather than the desired 45°. This can be remedied by extending the network bandwidth at the low frequency end by bridging the capacitor $C_1$ with a resistor whose value is $N^{\beta/6}$ $R_1$. Such a resistor is diagrammed in FIG. 10 and is designated $R_L$. Likewise, the upper frequency of useful network can be extended by employing a feedback capacitor $C_H$ around the amplification stage 12*a*.

$$C_H=\frac{C_x}{N^{(1-\beta/6)}}$$

Figure 11:
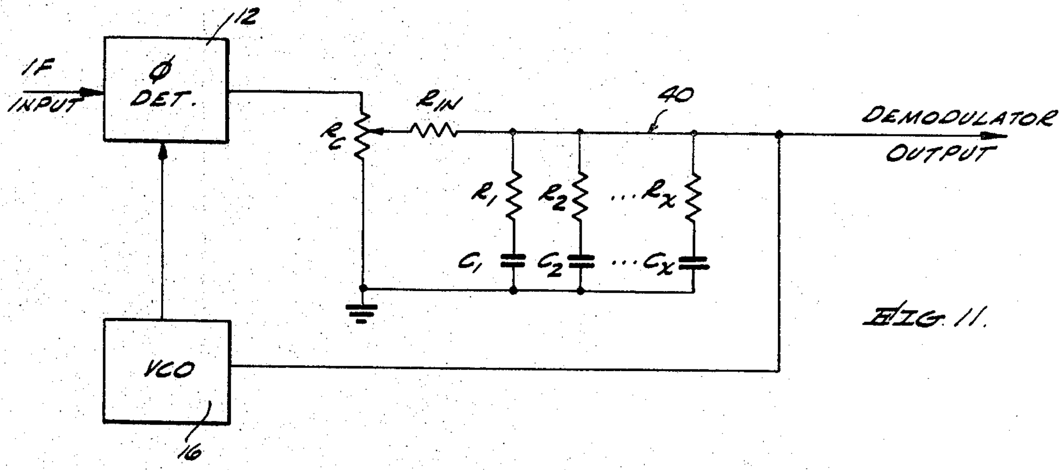
FIGS. 10 and 11 are combination schematic and block diagrams of additional embodiments of the invention.

Herebefore the constant slope network of the present invention has been described in conjunction with an active amplification stage 12*a* to form an active loop filter or network. In many applications, however, where sufficient loop gain is provided by the phase detector and the VCO, the novel invention may take the form of a passive network, such as the one shown in FIG. 11 to which reference is made herein. In such an arrangement the active amplification stage 14*a* is eliminated and the network 40 is connected between ground and the demodulator's output, which is also supplied to the VCO input.

From the foregoing description, it should thus be appreciated that in accordance with the teachings of the present invention a constant slope network is incorporated in a phase-lock loop to produce a gain slope expressed in db/octave which is substantially constant extending over several decades of frequency. The loop gain is a function of phase detector drive level, while the constant gain slope results in a fixed, substantially constant closed loop damping regardless of loop gain or bandwidth. With a single adjustment, the phase-lock loop can be made to demodulate with optimum performance a wide range of signal indexes or with the same loop adjustment be made to provide optimum tracking of a doppler shifted signal whose received power varies over a wide range.

Herebefore, particular embodiments of the invention have been described with sufficient detail to enable those familiar with the art to practice the invention. However, in order to further highlight the novelty and advantages of the invention, an analysis of loop performance will be presented followed by a specific design example to meet stated performance requirements. For clarity of presentation the analysis and the example will be presented under separate headings.

ANALYSIS OF LOOP PERFORMANCE

The performance of the adaptive loop configuration results from the loop filter, which consists of pole-zero pairs distributed in frequency with geometric uniformity. This loop filter provides a gain slope, expressed in db/octave, which is constant to within an arbitrarily small ripple error and extends over several decades of frequency. The useful novelty of such an arrangement is that the loop gain is a function of phase detector drive level, while the constant slope provides fixed damping regardless of loop gain (and concomitant bandwidth) as long as the frequency of unity loop gain is within the loop network bandwidth. Such a receiver demodulator offers unusual flexibility in that a single gain control optimizes the loop over a wide range of spectral bandwidths.

The intent of the present analysis is to characterize the threshold behavior of the subject invention when the input signal consists of a carrier modulated with a pre-emphasized band of gaussian noise.

Figure 12:
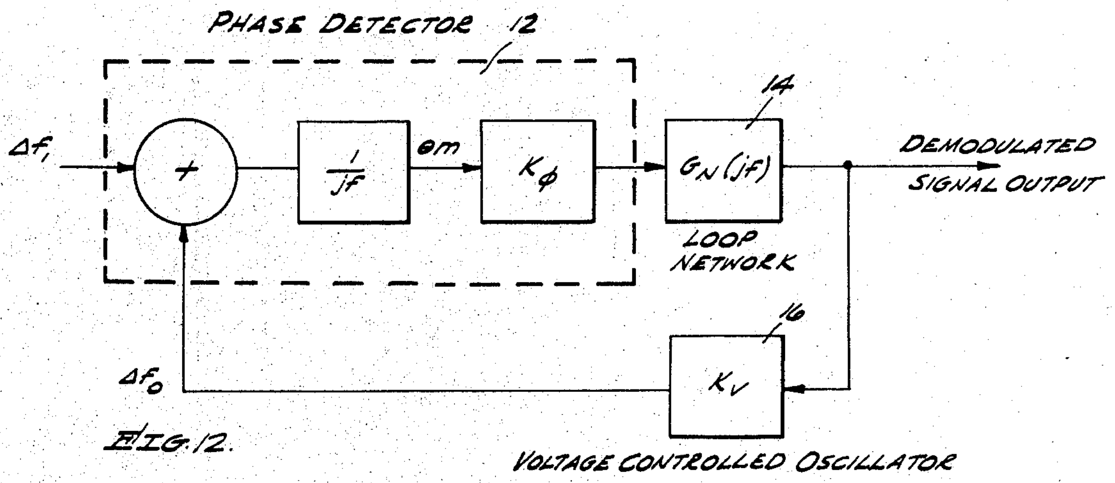
FIGS. 12, 13, and 14 are diagrams useful in analyzing loop performance.

A block diagram of the linearized phase-lock loop model, suitable for this analysis, is given in FIG. 12, wherein elements like those previously described are designated by like numerals.

The idealized loop filter function, $G_N$, is $$G_N=\frac{f_0^{\alpha/6}}{K_\phi K_V f^{(\alpha/6-1)}}e^{-j\pi/2(\alpha/6-1)} \qquad (1x)$$

where $K_\phi$=phase detector gain, volts/radian
$K_V$=VCO gain, Hz./volt
$f_0$=frequency of unity loop gain
$\alpha$=desired open-loop gain slop, db/octave.

The resultant closed loop response function, $G_{CL}$, is $$G_{CL}=\frac{\Delta f_i}{\Delta f_0}=\frac{1}{1+(f/f_0)^{\alpha/6}\cos{\alpha\pi/12}+j(f/f_0)^{\alpha/6}\sin{\alpha\pi/12}} \qquad (2x)$$

Phase error due to frequency modulation is equal to $$\frac{\theta_m}{\Delta f_1}=\frac{1/jf}{1+K_\phi K_V G_{N/jf}}=\frac{1/jf}{1+G_{OL}} \qquad (3x)$$

where $G_{OL}$=open-loop response.

With practical values of signal index, and loop bandwidths adjusted for optimum demodulation, the frequency of unity loop gain, $f_o$, is appreciably greater than the top baseband frequency. Under such conditions of interest, the mean square phase error due to modulation is $$\bar{\theta}_m^2 \doteq \frac{(\Delta f_i/f)^2}{|G_{OL}^2|} \qquad (4x)$$

where, in general, $G_{OL}=(f_o/f)^{\alpha/6}$.

Next the signal deviation density is characterized. The modulating band of gaussian noise produces a full load RMS deviation of $F_{RMS}$. The effect on the frequency distribution of deviation density introduced by pre-emphasis is approximated in the following expression.

$$\bar{\psi}^2 = \frac{\Delta F_{RMS}^2}{2.77 f_b}[1+5.3(f/f_b)^2]\text{Hz.}^2/\text{Hz.} \qquad (5x)$$

where $f_b$=top baseband frequency.

This expression is chosen because it is mathematically tractable and yet follows the pre-emphasis of CCIR Recommendation 275 to within 0.5 db.

By substituting Equation 5x into Equation 4x, and integrating from 0 to $f_b$, the total phase error due to modulation is obtained. Specifically, $$\bar{\theta}_m^2 = \int_0^{fb} \frac{F_{RMS}^2}{2.77 f_b} \times \frac{[1+5.3(f/f_1)^2]}{f_o^{\alpha/3} f^{(2-\alpha/3)}} df$$

$$= \frac{\Delta F_{RMS}^2[6.3\alpha/3-4.3]}{2.77 f_o^{\alpha/3} f_b^{(2-\alpha/3)}[\alpha/3)^2-1]} \qquad (6x)$$

Mean square phase error due to input thermal noise is taken to be equal to $$\bar{\theta}n^2 \doteq \frac{KTf_o}{C} F_1(\alpha) \text{ Radians}^2 \qquad (7x)$$

where

C=input carrier power, watts

KT=IF noise power density, watts/Hz.

$f_o$=frequency of unity open-loop gain $F_1(\alpha)$=ratio of one-sided loop noise bandwidth to frequency, $f_o$.

Figure 10:
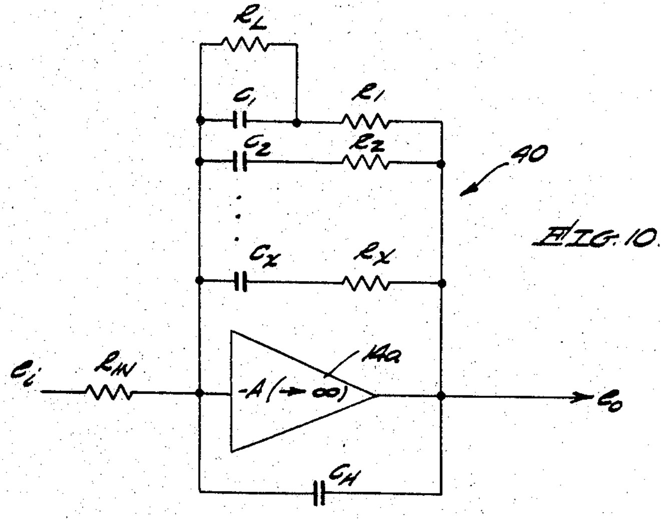

The function $F_1(\alpha)$ is plotted in FIG. 10.

Demodulator threshold is associated with a total mean square phase error which is the sum of mean square phase errors due to input thermal noise and modulation; that is, $$\bar{\theta}_T^2 = \bar{\theta}_n^2 + \bar{\theta}_m^2 \text{ Radians}^2 \qquad (8x)$$

Appropriate substitution for the constituent components of total phase error gives $$\bar{\theta}_T^2 = \frac{KTf_o(\alpha)}{C} + \frac{\Delta F_{RMS}^2[6.3\alpha/3-4.3]}{2.77 f_b^{(2-\alpha/3)} f_o^{\alpha/3}[(\alpha/3)^2-1} \qquad (9x)$$

It is observed that noise error varies with $f_o$, whereas modulation error varies inversely as the $\alpha$/3th power of $f_o$. There is therefore a value of $f_o$ which minimizes total mean square phase error for any given signal format. To derive this value of $f_o$ let $d\theta_T^2/df_o=0$. With such a value it is possible to determine that the result is a minimum, and solve for the desired quantity, That is, $$\frac{f_o}{f_b} = \left[\frac{1+\alpha/2}{\bar{\theta}T^2}\right]^{3/\alpha} M_{RMS}^{6/\alpha}\left[\frac{6.3\alpha/3-4.3}{(\alpha/3)^2-1}\right] \qquad (10x)$$

where $$M_{RMS} = \frac{\Delta F_{RMS}}{fb} \qquad (11x)$$

Substitution of Equation 10x into Equation 9x permits determination of the apportionment of total phase error between that due to noise and that due to modulation. When $f_o$ is chosen to minimize $\theta_T^2$, the result is $$\bar{\theta}_m^2 = \frac{\bar{\theta}T^2}{1+\alpha/2} \qquad (12x)$$

and $$\bar{\theta}_n^2 = \frac{\bar{\theta}_T^2\alpha/2}{1+\alpha/2} \qquad (13x)$$

From Equation 5x it is seen that the modulating signal density at the top of the baseband is equal to $$\bar{\psi}_{TOP}^2 = 2.26\frac{\Delta F_{RMS}^2}{f_b} = 2.26 M_{RMS}^2 f_b \text{ Hz.}^2/\text{Hz.} \qquad (14x)$$

The frequency-noise density in the top channel due to input thermal noise is approximately $$\frac{KTf_b^2}{C}\text{Hz.}^2/\text{Hz.} \qquad (15x)$$

The ratio of these two quantities is approximately equal to pre-emphasized top channel NPR. That is, $$NPR_{TOP} \doteq 2.26 M_{RMS}^2 \frac{C}{KTf_b} \qquad (16x)$$

Substituting for $M_{RMS}$ from Equation 16x into Equation 9x and rearranging gives $$\frac{C}{KTf_b}^{(1+\alpha/3)}_{@\text{ Threshold}}$$

$$= \frac{NPR_{TOP}}{2.26} F_1(\alpha)^{\alpha/3}\left[\frac{6.3\alpha/3-4.3}{(\alpha/3)^2-1}\right]\left[\frac{(1+\alpha/2)^{(1+3/\alpha)}}{\alpha/2(\bar{\theta}_T^2)^{(1+2/\alpha)}}\right]^{\alpha/3} \qquad (17x)$$

$$\doteq \frac{NPR_{TOP}}{2.26} F_1(\alpha)^{\alpha/3}\left[\frac{6.3\alpha/3-4.3}{(\alpha/3)^2-1}\right]\left[\frac{200}{\alpha}\right]^{\alpha/3}_{\text{For } \bar{\theta}_T^2=0.175} \qquad (18x)$$

This expression may be simplified as $$\frac{C}{KTf_b}^{(1+\alpha/3)} = NPR_{TOP} F_1(\alpha)^{\alpha/3} F_2(\alpha) \qquad (19x)$$

Next several values of $\alpha$ ranging from 6 to 10 db/octave are considered. The resulting functions $F_1$ and $F_2$ are as follows, wherein $$F_1 \doteq 0.74\frac{18.2-\alpha}{11.8-\alpha}$$

| $\alpha$ | $F_1(\alpha)$ | $F_1(\alpha)^{\alpha/3}$ | $F_2(\alpha)$ | Threshold $\bar{\theta}_T^2$, radians$^2$ | $\frac{C}{KTf_b}^{(1+\alpha/3)}$ |
|---|---|---|---|---|---|
| 6 | 1.57 | 2.46 | $1.59\times10^3$ | 0.175 | $3.91\times10^3$ |
| 7 | 1.66 | 3.26 | $2.74\times10^3$ | 0.175 | $8.95\times10^3$ |
| 8 | 1.80 | 4.80 | $4.9\times10^3$ | 0.175 | $2.35\times10^4$ |
| 9 | 2.43 | 14.60 | $8.9\times10^3$ | 0.175 | $1.3\times10^5$ |
| 10 | 3.45 | 62.0 | $1.6\times10^4$ | 0.175 | $9.9\times10^5$ |

Figure 13:
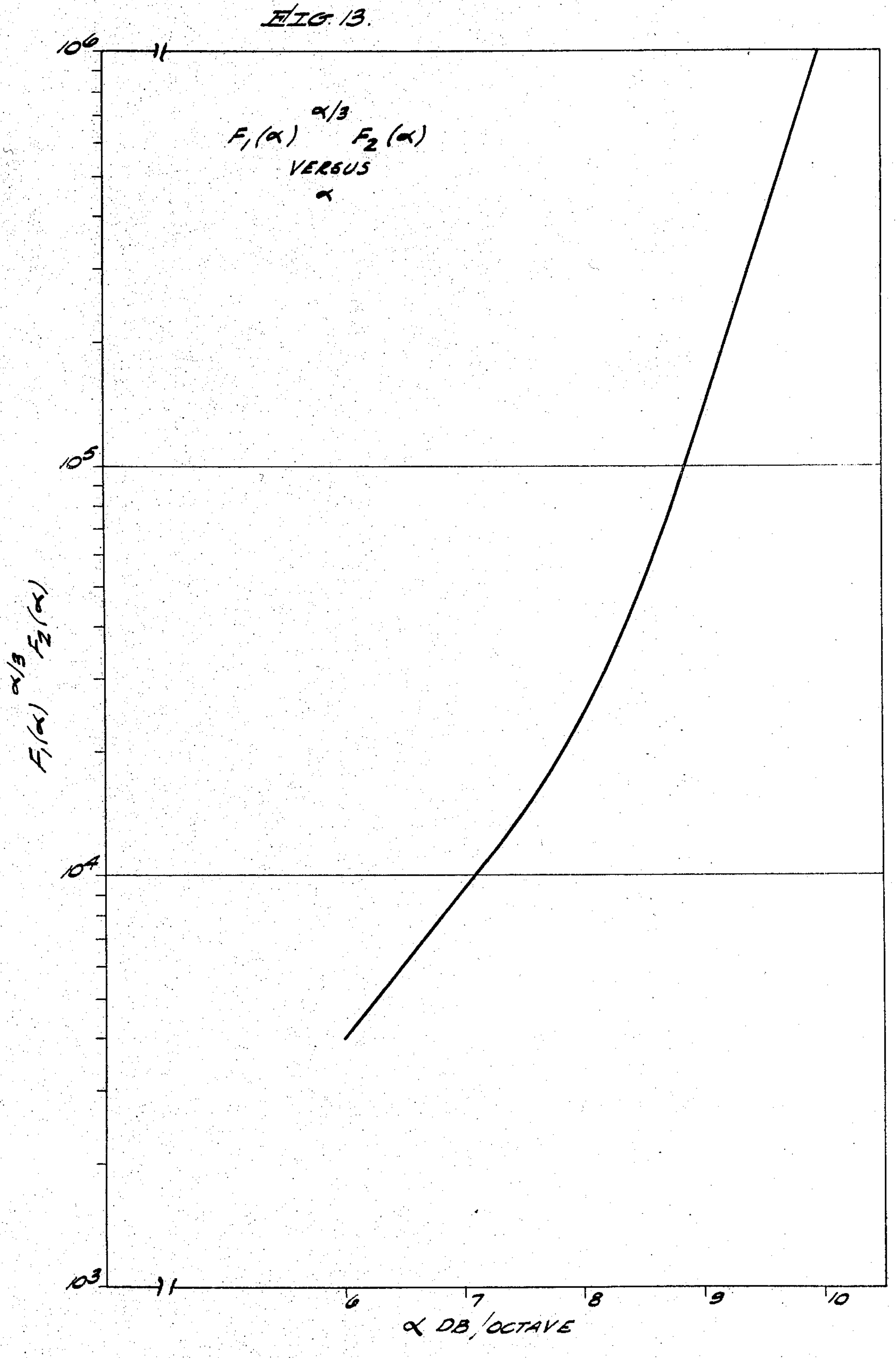
Figure 14:
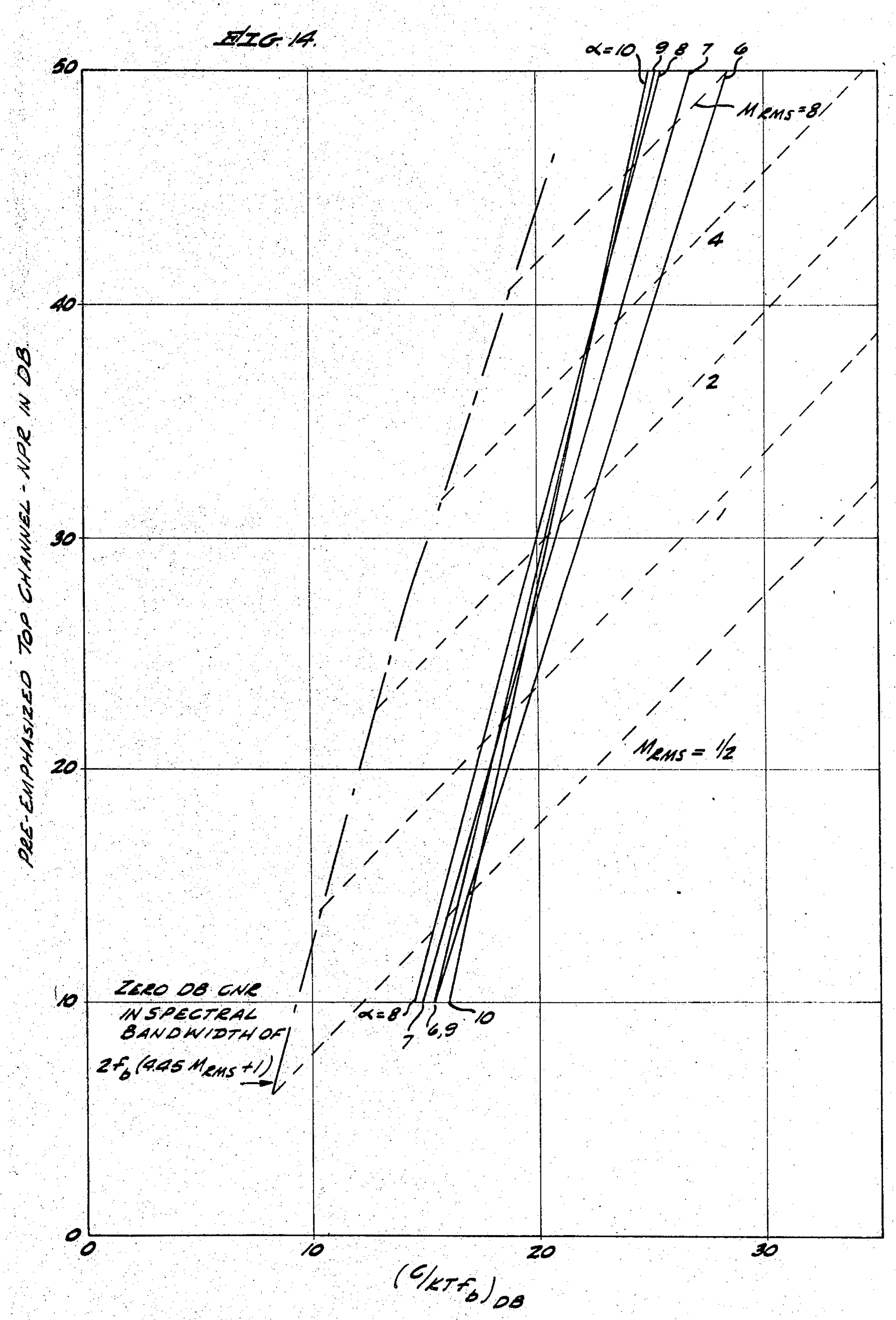

The results of the above computations are plotted in FIGS. 13 and 14.

It should be pointed out that although the linearized model used for the analysis presented above lacks validity in the region of threshold, the total mean square phase error associated with threshold may be used to predict threshold performance. The threshold value of total mean square phase error has been determined experimentally and found to be approximately 0.175 radian$^2$ when automatic gain control (AGC), rather than amplitude limiting precedes the phase detector.

Equation 7x is accurate only for above-threshold loop carrier-to-noise ratios. Its inviting simplicity, however, has led to its use in the threshold region. The inaccuracy of this extension is compensated in some measure by the proper choice of $\bar{\theta}_T^2$.

Also, practical phase detectors for the application proposed have a sinusoidal response. In the region of threshold, peak phase excursions will exceed the linear portion of the phase detector characteristic. This non-linearity introduces (signal X noise) and (noise X noise) terms which are not accounted for in the linearized model. These omitted terms do, however, contribute excess baseband noise power which is most pronounced at low baseband frequencies.

Finally, as the carrier power diminishes, instantaneous phase error eventually exceeds the dynamic range of the phase detector a high percentage of the time. With each occurrence, the VCO wave is caused to slip one or more cycles from synchronism with the input waveform. Each cycle slip produces a large voltage impulse at baseband. This phenomenon is also excluded from a linear analysis. Such an analysis therefore contains no mechanism whereby the below-threshold slope can be accurately predicted. It is observed experimentally, however, that the higher the index of operation, the more rapid the decrease in NPR below threshold.

FIG. 14 is a locus of threshold points and is therefore useful in demodulator design. When $C/KTf_b$ is sufficiently high to operate the demodulator above threshold, the normally used FM improvement relationship applies. Equation 16x applies for above threshold operation and is the basis of the dashed curves of FIG. 14.

To illustrate the above discussed point let it be assumed that the demodulator performance requirement implies a top channel NPR of 30 db for single voice channel operation. With this requirement it is possible to find from FIG. 14 that value of $\alpha$ which maximizes demodulator sensitivity (i.e., the value of $\alpha$ which minimizes required $C/KTf_b$).

Entering FIG. 14 at 30 db and moving to the right, the first curve encountered is that for $\alpha=8$ db/octave. From this intersection it is determined that the required value of $C/CTf_b$ is 20 db. Also the required value of $M_{RMS}$ is approximately 2. The top baseband frequency, $f_b$, for a single voice channel is approximately 4 kHz. From Equation 11x it is seen that $$M_{RMS}=\frac{F_{RMS}}{f_b}$$

wherefrom it is determined that the RMS carrier deviation for $NPR_{TOP}=30$ db is $$\Delta F_{RMS}=M_{RMS}\,f_b\doteq(2)(4\text{ kHz.})=8\text{ kHz.}$$

It is also seen from FIG. 14 that a minimum $C/KTf_b$ of 20 db is required. The corresponding IF input carrier-to-noise density ratio $(C/KT)$ is $$\left[\frac{C}{KT}\right]_{db}=\left[\frac{C}{KTf_b}\right]_{db}+10\log f_b=56\text{ db}$$

The input spectral bandwidth for a single voice channel is usually taken to be $$B_{IF}=2f_b(4.55M_{RMS}+1)$$

which for this case is 79.2 kHz.

The threshold carrier-to-noise power ratio (CNR) measured in an IF bandwidth of 79.2 kHz. is $$CNR_t=\left[\frac{C}{KT}\right]_{db}-10\log B_{IF}$$

$$=56-49=7\text{ db}$$

A conventional (limiter-discriminator) FM receiver would, under the same conditions of $M_{RMS}$ and $B_{IF}$, have a threshold CNR of approximately 12 db. The new demodulator therefore extends threshold sensitivity by 5 db or so. Such increased sensitivity would be extremely costly to achieve by other methods—such as the use of a much larger (higher gain) antenna system.

DESIGN EXAMPLE

For the design example, let it be assumed that a phase-lock loop is desired in which the optimum frequency of unity open-loop gain $(f_o)$ may vary from 703 kHz. to 705 mHz. or approximately 10:1. The first point to be considered is the design of the constant slope network. It is assumed that the network is to have a useful bandwidth of at least 10:1. For $\alpha=8$ db/octave, the required network slope $\beta$ is 2 db/octave since $\beta=\alpha-6$.

To determine the number of branches or pole-zero pairs of the network it should be recalled that the upper and lower frequencies may be expressed as $\sqrt{P_{x-1}Z_x}$ and $\sqrt{P_1Z_1}$ respectively. Thus, the useful bandwidth ratio, herein designated as BWR may be expressed as $$BWR=\sqrt{\frac{P_{x-1}Z_x}{P_1Z_1}} \qquad (1y)$$

From Equation 5

$$BWR=\sqrt{N^{(x-2)}N^{(x-1)}}=N^{\frac{2x-3}{2}} \qquad (2y)$$

Figure 15:
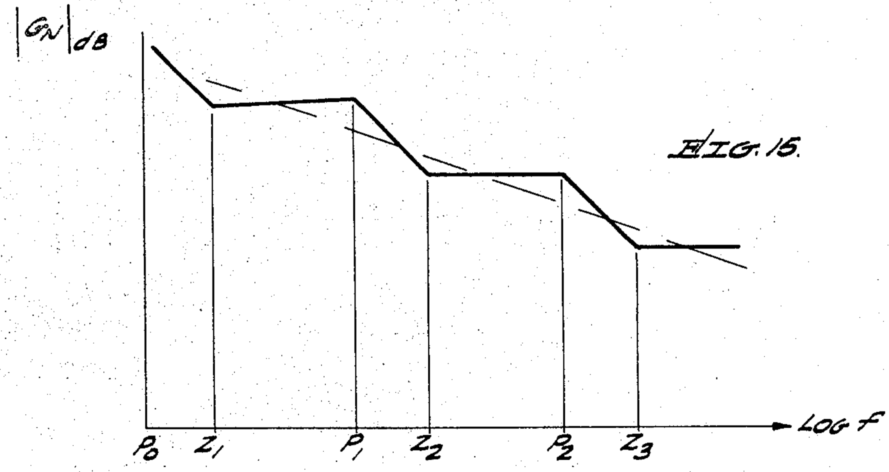
FIGS. 15 and 16 are diagrams useful in explaining a specific design example.

In the present example BWR equals 10 and therefore the last expression may be solved for $x$, with $x$ chosen as the next integer which in this case is 3. Thus, 3 branches are required for the constant slope network. The three pole-zero pairs are shown in FIG. 15 to which reference is made herein. With $N=10$ and $x=3$, the actual network's bandwidth ratio is found to be $$10^{\frac{2\cdot3-3}{2}}=10^{3/1}=31.6 \qquad (3y)$$

Designating the lower and upper frequencies of the useful bandwidth as $f_L$ and $f_U$ respectively, the geometric center of the network bandwidth may be made to be coincident with the geometric center of the required range of $f_o$, where $f_{oMIN}=.763$ mHz. and $f_{oMAX}=7.05$ mHz. That is, $$\sqrt{f_Lf_U}=\sqrt{f_{oMIN}f_{oMAX}} \qquad (4y)$$

But $f_U=31.6f_L$.

Substituting the various values for $f_U$, $f_{oMIN}$ and $f_{oMAX}$ in Equation 4y, it is determined that $$f_L=415\text{ kHz.} \qquad (5y)$$

Since $$f_L=\sqrt{Z_1P_1} \qquad (6y)$$

and since the Equation 3

$$P_1=N^{1-\beta/6}Z_1$$

$$f_L=Z_1N^{\frac{1-\beta/6}{2}} \qquad (7y)$$

and $$Z_1=f_LN^{\frac{\beta/6-1}{2}}=415\times10^{-1/3}=\frac{415}{2.16}=192\text{ kHz.}$$

Thus it is seen that the frequency of the first network zero $(Z_2)$ is 192 kHz. From Equation $6_1$ it is appreciated that once $R_1$ and $Z_1$ are known, $C_1$ can be calculated. Assuming $R_1=1K$ ohms, $$C_1=\frac{1}{2\pi R_1Z_1}=\frac{1}{2\pi\times1\times10^3\times192\times10^3}=833\text{ pf.} \qquad (8y)$$

From Equation 7 with $N=10$, $\beta=2$ and $R_1=1$ kHz.

$$R_2=\frac{R_1}{1.16}=860\Omega \qquad (9y)$$

and $$R_3=\frac{R_1}{2.51}=397\Omega \qquad (10y)$$

Equation 8 may be similarly used to derive $C_2$ and $C_3$, from the computed value of $C_1$. That is $$C_2=(0.116)\ (833)=97\text{ pf.} \qquad (11y)$$

$$C_3=(0.0251)\ (833)=21\text{ pf.} \qquad (12y)$$

Figure 16:
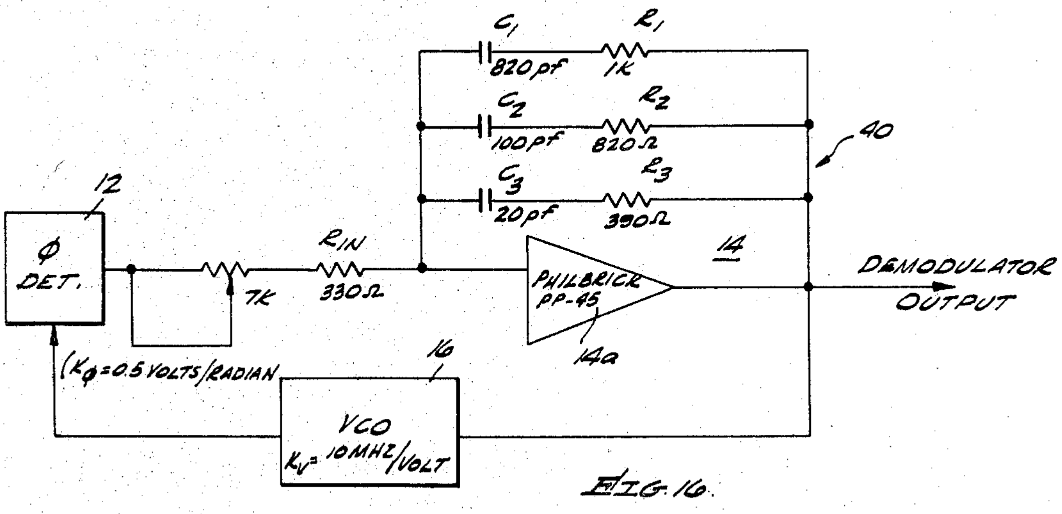

Attention is now directed to FIG. 16 wherein a three branch network with actual available 5% components is shown. Although the network impedance is rather low it can be used without scaling with an operational amplifier such as Philbrick Model PP-45, manufactured by Philbrick Research Company of Cambridge, Mass. Any equivalent amplifier may be employed however.

The value of $R_{IN}$ is chosen to provide the loop gain necessary for $f_{oMAX}$ of 7.05 mHz. The value determination is made as follows:

$$G[f_{oMAX}]=\frac{K_V K_\phi}{f_{oMIN}}\left[\frac{f_{oMIN}}{f_{oMAX}}\right]^{\alpha/6}\frac{R_1}{R_{IN}}=1$$

therefore $$R_{IN}=R_1\frac{K_V K_\phi}{f_{oMIN}}\left[\frac{f_{oMIN}}{f_{oMAX}}\right]^{\alpha/6}$$

Assuming that $K_V=10$ mHz./volt and $K_\phi=0.5$ volts/radian $$R_{IN}=10^3\frac{10\times10^6\times0.5}{0.763\times10^6}\left[\frac{0.763}{7.05}\right]^{4/3}=335\Omega$$

A practical value is 330 ohms.

The relationship between loop gain, G, and $f_o$ is $$G\propto\frac{1}{f_o^{\alpha/6}}$$

Therefore for a 10:1 adjustment range in $f_o$, the associated loop gain adjustment must be $10^{4/3}$, or approximately 22:1. This may be done by making $R_{IN}$ a series connection of a 330 ohm fixed resistor and a variable resistor whose maximum value is at least 7K ohms. Such an arrangement is shown in FIG. 7*a*. However, clearly any of the alternate forms of loop gain control (see FIGS. 7*b* and 7*c*) may be employed.

What is claimed is:

1. In a frequency demodulator of the type including a phase-lock loop to which an input signal is supplied and which includes at least a phase detector and a voltage-controlled oscillator the improvement comprising:

network means coupled to said phase detector and said voltage controlled oscillator, said network means exhibiting a substantially constant gain-frequency response slope, gain-frequency response over a selected frequency bandwidth, said network means including a selected plurality of parallel paths each including a capacitive means and resistive means, with the number of parallel paths selected to provide the gain-frequency response slope substantially less than 6 decibels per octave.

2. In a frequency demodulator of the type including a phase-lock loop to which an input signal is supplied and which includes at least a phase detector and voltage-controlled oscillator the improvement comprising:

network means coupled to said phase detector and said voltage controlled oscillator, said network means exhibiting a substantially constant slope, gain-frequency response over a selected frequency bandwidth, said network means having a plurality of parallel branches, each branch including a resistor and a capacitor, with the number of branches being a function of the ratio of the highest to the lowest frequencies of interest in said frequency bandwidth.

3. The frequency demodulator as recited in claim 2 wherein the ratio of the highest to the lowest frequencies of interest in said frequency bandwith is expressable as BWR, $$BWR=N^{\frac{2x-3}{2}}$$

where N is a constant integer and the number of branches is the closest integer to $x$ but not less than $x$.

4. The demodulator as recited in claim 3 wherein N is an integer in the range of 5 to 25.

5. The demodulator as recited in claim 3 wherein the resistor of a first of said branches, expressable as $R_1$, is related to the resistor $R_k$ in the $k_{th}$ branch, where $2<k<x$ by the relationship $$\frac{R_1}{R_k}=[N^{\beta/6}-1]N^{\beta/6(k-2)}$$

wherein $\beta$ is the network's slope in db/octave which is at least greater than zero and not greater than six.

6. The demodulator as recited in claim 5 wherein the capacitor in the $k^{th}$ branch, designated $C_k$, is related to the capacitor in the first branch, designated $C_1$ by $$\frac{C_k}{C_1}=\frac{R_1}{R_k}N^{(1-k)}$$

7. The demodulator as recited in claim 6 wherein the lowest frequency of interest, expressable as $f_L$, equals $\sqrt{Z_1P_1}$, where, $$P_1=N^{1-\beta/6}Z_1$$

and $$Z_1=\frac{1}{2\pi R_1C_1}$$

8. In frequency demodulator of the type including a phase-lock loop to which an input signal is supplied and which includes at least a phase detector and a voltage-controlled oscillator the improvement comprising:

network means coupled to said phase detector and said voltage-controlled oscillator, said network means exhibiting a substantially constant slope, gain-frequency response over a selectable frequency bandwidth, said network being passive and including a plurality of parallel branches connected between a first terminal and a second terminal, each branch including a resistor and a capacitor, with the number of branches being a function of the ratio of the highest to the lowest frequencies of interest in said frequency bandwidth, said network further including first means for connecting said first terminal to said voltage-controlled oscillator and through adjustable input means to said phase detector and second means for connecting said second terminal to a reference potential.

9. The demodulator as recited in claim 8 wherein the ration of the highest to the lowest frequencies of interest in said frequency bandwidth is expressable as BWR, $$BWR=N^{\frac{2x-3}{2}}$$

where N is a constant integer and the number of branches is the closest integer to $x$ but not less than $x$.

10. The demodulator as recited in claim 9 wherein the resistor of a first of said branches, expressable as $R_1$, is related to a resistor $R_k$ in the $k_{th}$ branch, by the relationship $$\frac{R_1}{R_k}=[N^{\beta/6}-1]N^{\beta/6(k-2)}$$

wherein $\beta$ is the network's slope in db/octave which is at least greater than zero and not greater than six and $2<k<x$.

11. The demodulator as recited in claim 10 wherein a capacitor in the $k_{th}$ branch, designated $C_k$ is related to a capacitor in the first branch, designated $C_1$, by $$\frac{C_k}{C_1}=\frac{R^1}{R_k}N^{(1-k)}$$

and wherein the lowest frequency of interest, expressable as $f_L$, equals $\sqrt{Z_1P_1}$, where, $$P_1=N^{1-\beta/6}Z_1$$

and $$Z_1=\frac{1}{2\pi R_1C_1}$$

12. A frequency demodulator of the type including a phase-locked loop to which an input signal is supplied and which includes at least a phase detector and a voltage-controlled oscillator, wherein said phase-lock loop includes adjustable input means, amplifying means and means connecting said adjustable input means between said phase detector and said amplifying means and said amplifying means between said adjustable input means and said oscillator, said loop further including means connecting said network across said amplifying means, said network means having a plurality of parallel branches, each branch including a resistor and a capacitor, with the number of branches being a function of the ratio of the highest to the lowest frequencies of interest in said frequency bandwidth.

13. The demodulator as recited in claim 12 wherein the ratio of the highest to the lowest frequencies of interest in said frequency bandwidth is expressable as BWR, $$BWR=N^{\frac{2x-3}{2}}$$

where N is a constant integer and the number of branches is the closest integer to $x$ but not less than $x$.

14. The demodulator as recited in claim 13 wherein the resistor of a first of said branches, expressable as $R_1$, is related to a resistor $R_k$ in the $k_{th}$ branch, by the relationship $$\frac{R_1}{R_k}=[N^{\beta/6}-1]N^{\beta/6(k-2)}$$

wherein $\beta$ is the network's slope in db/octave which is at least greater than zero and not greater than six and wherein $2\leq k\leq x$.

15. The demodulator as recited in claim 14 wherein a capacitor in the $k_{th}$ branch, designated $C_k$ is related to a capacitor in the first branch, designated $C_1$, by $$\frac{C_k}{C_1}=\frac{R_1}{R_k}N^{(1-k)}$$

and wherein the lowest frequency of interest, expressable as $f_L$, equals $\sqrt{Z_1P_1}$, where, $$P_1=N^{1-\beta/6}Z_1$$

and $$Z_1=\frac{1}{2\pi R_1C_1}$$

16. The demodulator as recited in claim 15 wherein said adjustable input means include an adjustable resistor and an input capacitor connected between said phase detector and a reference potential and an input resistor connected between said amplifying means and a movable arm of said adjustable resistor.

17. A demodulator comprising:

a phase detector to which an input signal is applied;

a voltage-controlled oscillator having an output connected to said phase detector; and means coupling the output of said phase detector to the input of said voltage controlled oscillator, said means including network means exhibiting a substantially constant slope, gain-frequency response over a selectable frequency bandwidth, said network means having poles and zeros with a ratio of frequencies of successive poles and zeros that is substantially constant.

18. A demodulator comprising:

a phase detector to which an input signal is applied;

a voltage-controlled oscillator having an output connected to said phase detector; and means coupling the output of said phase detector to the input of said voltage controlled oscillator, said means including network means exhibiting a substantially constant slope, gain-frequency response over a selectable frequency bandwidth, said network means having a plurality of parallel branches, each branch including a resistor and a capacitor, with the number of branches being a function of the ratio of the highest to the lowest frequencies of interest in said frequency bandwidth, and wherein the ratio of the highest to the lowest frequencies of interest in said frequency bandwidth is expressable as BWR, $$BWR=N^{\frac{2x-3}{2}}$$

wherein N is a constant integer and the number of branches is the closest integer to $x$ but not less than $x$.

19. A modulator as recited in claim 18 wherein the resistor of a first of said branches, expressable as $R_1$ is related to the resistor $R_k$ in the $k_{th}$ branch by the relationship $$\frac{R^1}{R_k}=[N^{\beta/6}-1]N^{\beta/6(k-2)}$$

wherein $2\leq k\leq x$ and $\beta$ is the network's slope in db/octave which is at least greater than zero and not greater than six and wherein the capacitor in the $k_{th}$ branch, designated $C_k$, is related to the capacitor in the first branch, designated $C_1$, by $$\frac{C_k}{C_1}=\frac{R_1}{R_k}N^{(1-k)}$$

and wherein the lowest frequency of interest, expressable as $f_L$, equals $\sqrt{Z_1P_1}$, where, $$P_1=N^{1-\beta/6}Z_1$$

and $$Z_1=\frac{1}{2\pi R_1C_1}$$

20. A demodulator as recited in claim 19 wherein said network is passive consisting of a plurality of branches connected between a first terminal and a second terminal, each branch including a resistor and a capacitor, with the number of branches being a function of the ratio of the highest to the lowest frequencies of interest in said frequency bandwidth, said network further including first means connecting said first terminal to said voltage controlled oscillator and through adjustable input means to said phase detector and second means connecting said second terminal to a reference potential.

21. A demodulator as recited in claim 19, wherein said demodulator further includes adjustable input means, amplifying means and means connecting said adjustable input means between said phase detector and said amplifying means and said amplifying means between said adjustable input means and said oscillator and means connecting said network across said amplifying means.

22. The demodulator as recited in claim 21 wherein said adjustable input means include an adjustable resistor and an input capacitor connected between said phase detector and a reference potential and an input resistor connected between said amplifying means and a movable arm of said adjustable resistor.

23. In a frequency demodulator of the type including a phase-lock loop to which an input signal is supplied and which includes at least a phase detector and a voltage-controlled oscillator the improvement comprising network means coupled to said phase detector and said voltage controlled oscillator, said network means exhibiting a substantially constant slope, gain-frequency response over a selectable frequency bandwidth, said network means including a plurality of parallel branches, each branch including a resistor and a capacitor, said network means exhibiting alternating poles and zeros having logarithmic frequency spacing.

24. In a frequency demodulator including a phase locked loop, network means coupled in said loop for providing a gain-frequency response with a substantially constant slope over a selected frequency bandwidth comprising a plurality of parallel branches, each branch including resistive means and capacitive means, the number of said branches being a function of the ratio of the highest to lowest frequencies of said selected frequency bandwidth.

References Cited

UNITED STATES PATENTS

| | | | |
|---|---|---|---|
| 3,209,271 | 9/1965 | Smith | 325—346X |

| | | | |
|---|---|---|---|
| 3,199,037 | 8/1965 | Graves | 329—122(UX) |
| 3,286,188 | 11/1966 | Castellano | 329—122 |
| 3,328,719 | 6/1967 | De Lisle et al. | 331—25 |
| 3,346,815 | 10/1967 | Haggai | 329—122 |
| 3,393,280 | 7/1968 | Vaughan et al. | 329—122X |

ALFRED L. BRODY, Primary Examiner

U.S. Cl. X.R.

325—346, 419; 331—23

PO-1050
(5/69)

UNITED STATES PATENT OFFICE
CERTIFICATE OF CORRECTION

Patent No. 3,551,829 Dated December 29, 1970

Inventor(s) Theodore F. Haggai

It is certified that error appears in the above-identified patent and that said Letters Patent are hereby corrected as shown below:

Column 1, line 56, change "its" to --it--.

Column 4, line 70, change "ben" to --been--.

Column 5, line 50, change "charcteristics" to --characterist:

Column 7, equation (9x), at the end of the equation after "-1" add --]--.

Column 9, line 47, change that part of the equation "(4.55 " to --(4.45 --.

Column 10, equation (3y), change "$=10^{3/1}$" to --$=10^{3/2}$--; line 50, change "$(Z_2)$" to --$(Z_1)$--.

Column 11, line 56, change "selected" to --selectable--.

Column 12, line 22, after "In" add --a--; line 43, change "ration" to --ratio--; line 65, change that part of the equation "$\frac{R^1}{R_k}$" to --$\frac{R_1}{R_k}$--

Column 14, line 13, change "modulator" to --demodulator--; line 17, change that part of the equation "$\frac{R^1}{R_k}$" to --$\frac{R_1}{R_k}$--.

Signed and sealed this 10th day of August 1971.

(SEAL)
Attest:

EDWARD M.FLETCHER,JR.
Attesting Officer

WILLIAM E. SCHUYLER, JR.
Commissioner of Patents